3,038,807
METHOD FOR COLORING POPCORN

William H. Cathcart, New Canaan, Conn., and Harold G. Beattie, New York, and Charles B. Berquist, Portchester, N.Y., assignors to The Great Atlantic & Pacific Tea Company, Inc., New York, N.Y., a corporation of Maryland
No Drawing. Filed Feb. 1, 1960, Ser. No. 5,601
5 Claims. (Cl. 99—83)

This invention relates to a novel and improved method for coloring popcorn, and to the product produced thereby.

It is common in the art to color foods and food products. Coaltar colors for such use must be certified as suitable for such use by the United States Food and Drug Administration in order that their use for such purpose be permitted under the laws of the United States. Colors so certified for use in coloring foods and foods products are sometimes referred to as FD & C colors, and, for the sake of convenience, such colors are hereafter referred to as "edible" colors.

In the prior methods used for the coloring of foods and food products, wherein an oil was contained in or employed in the preparation or processing of the food or food product, it was customary to employ oil-soluble colors. The oil-soluble color was incorporated in solution in the oil contained in or employed in the preparation or processing of the food or food product and imparted an even and uniform color to the food or food product. Thus, for example, in the prior production of popcorn it was customary to color the popcorn by employing a solution of yellow oil-soluble coloring matter in the oil utilized in popping the corn.

Recently, a number of oil-soluble colors, including the yellow oil-soluble color used in the coloring of popcorn, have been removed from the category of colors heretofore certified by the United States Food and Drug Administration and thus are no longer properly available for use in coloring foods or food products. The oil-soluble colors remaining which impart to food products a yellow or golden color have been found not to be stable or practical for use in the preparation of food products which require the use of high baking, roasting or cooking temperatures, as, for example, popcorn. Remaining oil-soluble colors, such, for example, as carotene, which might otherwise be suitable for the coloring of popcorn, were found to be unstable at the high temperatures required to pop the corn.

It has therefore become impractical to impart edible colors to foods subjected to high baking, roasting or cooking temperatures in manners analogous to those previously employed.

I is accordingly an object of this invention to provide a novel and improved method for coloring food products and particularly popcorn. A further object is to provide a method of coloring popcorn with edible colors, and particularly to provide a method for coloring the corn while it is being popped. Yet another object is to provide such a method to color popcorn yellow.

Other objects will in part be apparent and will in part appear hereinafter.

We have found that the above objects are efficiently obtained by employing in a particular manner an aluminum or calcium lake of a water-soluble FD & C certified color. Such lakes, as the art is aware, are respectively the aluminum or calcium salts of such a water-soluble color wherein the salt is extended on a substratum of alumina or other suitable substrata or combinations of substrata. Preparation of such lakes is old in the art and forms no part of this invention. Such lakes are commercially available.

The aluminum and calcium lakes of water-soluble FD & C colors which may be utilized in the practice of this invention are water-insoluble and are also insoluble in edible oils. Having no solubility in such oils, it is impossible to apply such lakes to the food product in oil solution as, for example, had been the prior practice of coloring popcorn by employing the oil-soluble color in the edible oil in which the corn was popped.

Most unexpectedly, we have discovered that the aluminum lake of FD & C yellow No. 5, although insoluble in edible oils, may be applied to unpoped popping corn in dry admixture with an edible dry ingredient, such as a seasoning agent, and that the thus treated unpopped popping corn may then be popped in edible oil, with a resulting impartation to the popcorn of a relatively uniform yellow color comparable to that previously achieved through the use of oil-soluble colors. In the practice of the invention, about 0.5–10% of dry powdered edible lake of a water-soluble edible color is mixed with 90–99.5% of an edible dry ingredient, such as sodium chloride, sugar or flour, and this dry mixture is then admixed with the food or food ingredients and is then baked, roasted or otherwise cooked at a suitable temperature. As applied to popcorn, 0.5–10% of a suitable dry powdered color, such as, for example, FD & C yellow No. 5 aluminum lake, is mixed with 90–99.5% of edible granular sodium chloride. The resulting dry mixture is then blended with unpopped popping corn in suitable seasoning proportion and the blend is then popped by subjecting it to a temperature of at least 400° F. in the presence of an edible oil. Surprisingly, the coloring matter becomes well distributed over the surface of the popped kernels giving them a relatively uniform yellow or golden appearance. Popcorn that has been dry popped may be similarly colored by applying the dry sodium chloride-lake mixture by sifting, tumbling or other suitable means.

The edible oils which may be employed in the popping of corn may be of vegetable or animal origin. Generally, vegetable oils, such as, for example, coconut, corn, cottonseed and peanut oils, are preferred.

In the case of other food products where different colors may be desirable, the aluminum and calcium lakes of FD & C yellow No. 5 and the corresponding lakes of other FD & C water-soluble colors may be employed by admixing them in dry powdered form in suitable proportions with one or more of the dry ingredients used in the preparation of such food products. Thus, cookie filling may be satisfactorily colored by admixing with sugar or other dry ingredient used in its preparation an aluminum or calcium lake of a water-soluble FD & C color in the proportion necessary to give the desired shade of such color.

FD & C yellow No. 5 aluminum lake gives to popcorn the customary desired golden or yellow appearance, but the aluminum or calcium lakes of other water-soluble FD & C colors may be similarly employed where a novel, striking or contrasting color is desired. Other water-soluble FD & C colors include:

FD & C Green No. 1
        FD & C Green No. 2
        FD & C Green No. 3
        FD & C Yellow No. 6
        FD & C Red No. 1
        FD & C Red No. 2
        FD & C Red No. 3
        FD & C Red No. 4
        FD & C Blue No. 1
        FD & C Blue No. 2
        FD & C Violet No. 1

For the purposes of illustration, the following example of the employment of FD & C yellow No. 5 aluminum lake in the coloring of popcorn is given:

*Example*

A 15½% dry powdered aluminum lake of FD & C yellow No. 5 (the dye being the trisodium salt of 3-carboxy-5-hydroxy-1-p-sulfophenyl-4-p-sulfophenylazopyrazole) was intimately mixed with edible finely divided granular sodium chloride in the proportions by weight of 97.5% sodium chloride and 2.5% of the dry powdered lake. Then, 2 oz. of this mixture was blended with 2 lbs. of unpopped popping corn. Then, 8 oz. of uncolored coconut oil was placed in a heated popper and brought to 470° F. The corn, lake and salt blend was then added. As the corn popped, the coloring mixture became extended to the expanding kernels and was deposited on the surface thereof. A highly satisfactory, relatively uniformly colored product resulted.

We claim:

1. A method for coloring popcorn which comprises forming a dry mixture of an edible lake of a water-soluble edible color, said lake being insoluble in water and in edible oil, and being selected from the group consisting of the calcium and aluminum lakes of such edible color, with edible dry ingredients in a proportion of about 0.5–10% of the edible lake and about 90–99.5% of said edible dry ingredients, blending said dry mixture with dry unpopped popping corn, and heating the resulting blend in the presence of an edible oil at a temperature and for a time sufficient to pop said popping corn.

2. A method for coloring popcorn which comprises forming a dry mixture comprising about 0.5–10% of the aluminum lake of trisodium 3-carboxy-5-hydroxy-1-p-sulfophenyl-4-p-sulfophenylazopyrazole and about 90–99.5% of edible dry sodium chloride, blending said dry mixture with dry unpopped popping corn, and heating the resulting blend in the presence of an edible oil at a temperature and for a time sufficient to pop said popping corn.

3. A method for coloring popcorn which comprises forming a dry mixture comprising about 0.5–10% of the aluminum lake of trisodium 3-carboxy-5-hydroxy-1-p-sulfophenyl-4-p-sulfophenylazopyrazole and about 90–99.5% of edible dry sodium chloride, blending said dry mixture with dry unpopped popping corn, and heating the resulting blend in the presence of an edible vegetable oil at a temperature and for a time sufficient to pop said popping corn.

4. A method for coloring popcorn which comprises blending dry unpopped popping corn with a mixture comprising about 90–99.5% edible dry ingredients and 0.5–10% of an edible lake selected from the group consisting of the calcium and aluminum lakes of water-soluble edible colors, said lake being further characterized in being insoluble in water and in edible oil, and heating the resulting blend in the presence of an edible oil at a temperature and for a time sufficient to pop said popping corn.

5. A method for preparing colored popcorn which comprises heating a blend of dry unpopped popping corn and a mixture comprising about 90–99.5% edible dry ingredients and 0.5–10% of an edible lake selected from the group consisting of the calcium and aluminum lakes of water-soluble edible colors, said lake being further characterized in being insoluble in water and in edible oil, said heating step being conducted in the presence of an edible oil at a temperature and for a time sufficient to pop said popping corn.

References Cited in the file of this patent

UNITED STATES PATENTS 2,741,559  Banowitz _____ Apr. 10, 1956

FOREIGN PATENTS 137,638  Australia _____ June 22, 1950

OTHER REFERENCES

"Chemical Analysis of Foods and Food Products," by M. B. Jacobs, Third Edition (1958), pub. by D. Van Nostrand Co., Inc. (Princeton), p. 105.

"The Chemistry and Technology of Cereals as Food and Feed," edited by Matz, 1959, pub. by The Avi Pub. Co., Inc. (Westport, Conn.), p. 49.

Code of Federal Regulations, Title 21, revised 1955, U.S. Government, Washington, D.C., 1956, pp. 63, 64 and 65.